United States

Sugiyama

4,150,872

Apr. 24, 1979

[54] MINIATURE AND LARGE APERTURE WIDE-ANGLE PHOTOGRAPHING LENS

[75] Inventor: Takahiro Sugiyama, Tokyo, Japan

[73] Assignee: Asahi Kogyo Kabushiki Kaisha, Tokyo, Japan

[21] Appl. No.: 831,317

[22] Filed: Sep. 7, 1977

[30] Foreign Application Priority Data

Sep. 9, 1976 [JP] Japan .................................. 51-108225

[51] Int. Cl.² ............................................. G02B 13/04
[52] U.S. Cl. ................................................... 350/214
[58] Field of Search ......................................... 350/214

[56] References Cited

U.S. PATENT DOCUMENTS

| | | | |
|---|---|---|---|
| 3,549,241 | 10/1968 | Mori | 350/24 |
| 4,013,350 | 3/1977 | Ogawa | 350/214 |

*Primary Examiner*—Conrad J. Clark
*Attorney, Agent, or Firm*—Sughrue, Rothwell, Mion, Zinn and Macpeak

[57] ABSTRACT

A miniature and large aperture wide-angle lens is composed of ten or eleven lenses grouped in nine lens components. In order from the object to the image side, the first lens component is a positive lens, and the second, third and fourth lens components are each negative meniscus lenses. The fifth lens components is a thick positive lens. The sixth lens component is a positive lens, and a diaphragm is disposed between the fifth and sixth lens components. The seventh lens component is a negative lens. The eighth lens component comprises a negative lens and a positive lens cemented together to form a positive lens. The ninth lens component comprises either one positive lens or two positive lenses.

3 Claims, 6 Drawing Figures

MINIATURE AND LARGE APERTURE WIDE-ANGLE PHOTOGRAPHING LENS

BACKGROUND OF THE INVENTION

The invention relates to a retrofocus-type wide-angle photographing lens having a large aperture ratio.

Recently, improved wide-angle lenses for photographing have been developed. Especially, the trend toward the design of lenses having both large aperture ratios and small size is quite remarkable. However, in view of lens performance, the requirements for large aperture ratio and miniaturization are contrary to each other. It is very difficult to solve this problem.

SUMMARY OF THE INVENTION

According to the present invention, a wide-angle photographic lens having an aperture ratio of 1:2.0 and 1:2.8 and an angle of view of 95°, is designed to maintain the back focal length sufficiently long yet efficiently compensate for the various aberrations and still be small in size. The lens system comprises ten or eleven lenses grouped in nine lens components. In order from the object side to the image side, the first lens component comprises a positive lens, the second lens component comprises a negative meniscus lens having its convex surface directed to the object, the third and forth lens components are negative meniscus lenses having their respective convex surfaces directed to the object, the fifth and sixth lens components are each positive lenses, the fifth lens component being a thick lens, the seventh lens component is a negative lens, the eighth lens component comprises a positive lens and a negative lens cemented together to form a positive lens, and the ninth lens component comprises one positive lens or two positive lenses. The diaphragm is disposed between the fifth lens component and the sixth lens component.

DETAILED DESCRIPTION OF THE INVENTION

Figure 1:
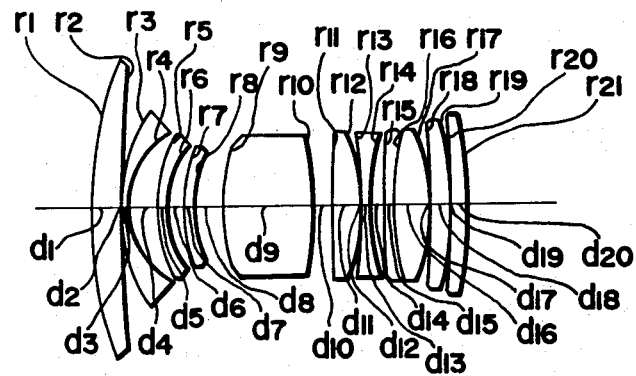
FIG. 1 is a simplified cross-sectional view of a lens system according to a first specific example of the invention.
Figure 2:
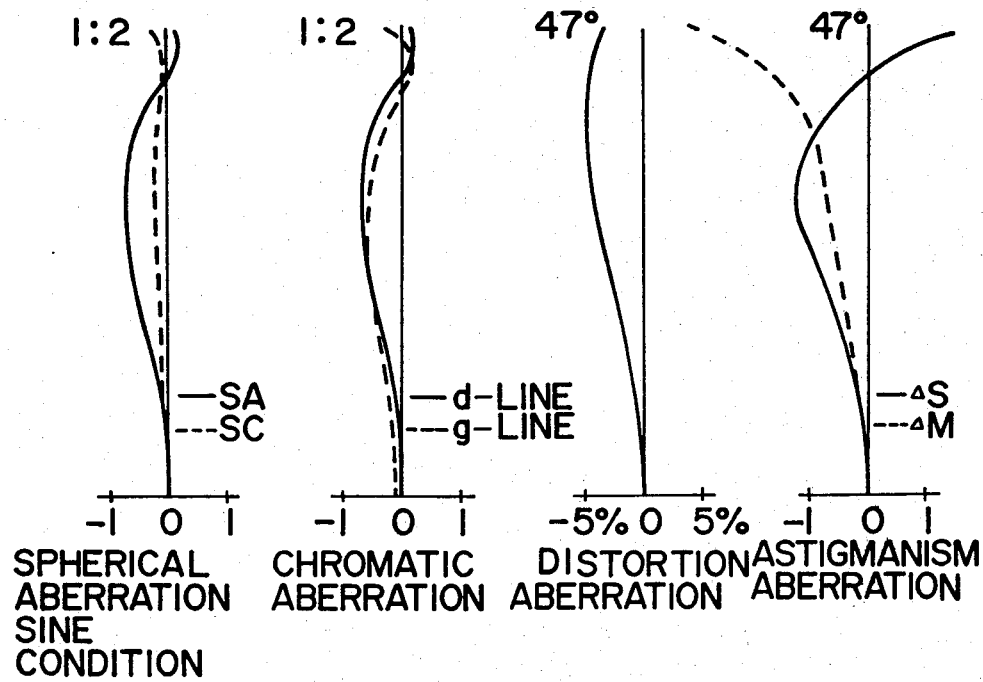
FIG. 2 are graphs showing the aberration curves obtained for the lens system constructed according to the first example.

The retrofocus lens according to the invention is characterized by the following five conditions as noted below, which will be described in greater detail later.

(1) $|F_{1.2.3.4.5}| > F/0.4$
(2) $0.3F < d_9 < 0.75F$
(3) $F < r_{14} < 2.5F$
(4) $0.3F < r_{16}(n_8 - n_9) < 0.75F$
(5) $2F < \Sigma d < 3F$ $F$: the resultant focal length
$F_{1.2.3.4.5}$: the resultant focal length of the first though the fifth lenses
$r_i$: the radius of curvature of the i-th surface
$d_j$: the thickness of the j-th lens or the spacing between lenses
$n_k$: the refractive index of the k-th lens
$\Sigma_d$: the overall length of the lens system

CONDITION (1)

The condition of $|F_{1.2.3.4.5}| > F/0.4$ is required to obtain a desirable backfocus in order to keep the size of the lens system small and at the same time to compensate for the aberration by appropriately arranging the lenses to be positioned after the sixth lens component.

Under the condition of $0 < F_{1.2.3.4.5} < F/0.4$, for the purpose of provision of the diaphragm between the fifth lens and the sixth lens, a certain space therefor is required. For this reason, in order to obtain the desirable backfocus with miniaturization, the focal lengths of the negative lenses up to the fourth lens must be shortened and the space between the fourth lens and the fifth lens must be increased or the focal length of the seventh negative lens must be shortened. Disadvatageously, in either case, the Petzval's sum is decreased and the aberration compensation is subject to being unbalanced.

Also, under the condition of $0 > F_{1.2.3.4.5}$ and $|F_{1.2.3.4.5}| < F/0.4$, it is easy to obtain a desirable backfocus, but the burden of compensation placed on the positive lenses after the sixth lens is thereby increased. Accordingly, aberration compensation is disadvantageously subject to being unbalanced as a whole.

CONDITION (2)

The condition of $0.3F < d_9 < 0.75$ means that the lens system is mimiaturized, the diaphragm is appropriately positioned and at the same time the chromatic aberration due to the magnification is compensated.

When $d_9$ is larger than its maximum limited value 0.75F, since the diaphragm is positioned between the fifth lens and the sixth lens and the lens system is designed on the basis of a constant amount of light, not only do the apertures of the lenses after the fifth lens become larger but also the entire length of the lens system becomes longer. When d is smaller than its minimum limited value 0.3F, the problem due to the positioning of the diaphragm can be solved. However, generally in a super wide-angle lens system over-value of the chromatic aberration of magnification generated in the negative lenses up to the fourth lens is compensated by under-value due to compensation of the fifth positive lens. Therefore, in view of the glass materials available for use in photographing lens, under the condition of $0.3F > d_9$, it is difficult to compensate the over-value of the chromatic aberration due to the magnification generated in the negative lenses up to the fourth lens.

CONDITION (3)

The condition of $F < r_{14} < 2.5F$ means that the balance of the coma aberration in the wide angle of view is improved and the desirable backfocus is obtained.

Under the condition of $F > r_{14}$, it is easy to obtain the desired backfocus, but it is difficult to balance the outside coma aberration generated in the surface $r_{14}$ over the wide angle of view.

Under the condition of $r_{14} > 2.5F$, not only it is difficult to obtain the desired backfocus, but also it is impossible to compensate for the inside coma aberration generated up to the sixth lens and there is a possibility of excessive compensation due to spherical aberration.

CONDITION (4)

The condition of $0.3F < r_{16}(n_8-n_9) < 0.75F$ is important for the compensation of the coma aberration.

Under the condition $0.3F > r_{16}(n_8-n_9)$, Petzval's sum is decreased so that distortion in the image plane is substantial, it is difficult to compensate for the aberration over the wide angle of view.

Under the condition $r_{16}(n_8-n_9) > 0.75F$, it is difficult to compensate for the coma aberration and, additionally, it is insufficient to compensate for the spherical aberration.

CONDITION (5)

The condition $2F < \Sigma d < 3F$ relates to the size of the lens system as well as the condition (2).

Under the condition of $\Sigma d > 3F$, the size of the lens system is larger and, additionally, there is a possibility of excessive aberration due to astigmatism.

Under the condition of $2F > \Sigma d$, it is impossible to obtain effective apertures which can be produced or manufactured in the lens construction according to the present invention.

The lens system according to the present invention satisfies the above mentioned conditions. Therefore, in the present invention, a desirable backfocus is obtained and in spite of aperture ratios of 1:2.0 and 1:2.8 and angle of view of 95°. The performance of the lens system according to the invention is good, and the size is small and compact.

Three specific examples of the present invention will be described herein below:

EXAMPLE 1

With reference to FIG. 1, a lens system comprising eleven lenses grouped in nine lens components was constructed. The first lens $L_1$ is a positive lens. The second, third and fourth lenses $L_2$, $L_3$ and $L_4$ are negative meniscus lenses each of which has its convex side directed to the object. The fifth lens $L_5$ is a thick positive lens, and the sixth lens $L_6$ is a positive lens. A diaphragm (not shown) is disposed between the fifth and sixth lenses. The seventh lens $L_7$ is a double concave lens. The eighth lens $L_8$ and the ninth lens $L_9$ are respectively a negative lens and a positive lens cemented together to form a doublet which is positive. The tenth lens $L_{10}$ and the eleventh lens $L_{11}$ comprising the rear lens component are both positive lenses. The radii of curvature $r_1$ to $r_{21}$, the spacings or thicknesses $d_1$ to $d_{20}$, the refractive indices $n_1$ to $n_{11}$ and the Abbé numbers $\nu_1$ to $\nu_{11}$ of the lenses are given below:

Example 1

| | | = 100, Aperture ratio = 1:2.0, field angle = ±47° | | |
|---|---|---|---|---|
| lens | radius of curvature | spacing and thickness | refractive index | Abbé No. |
| $L_1$ | $r_1 = 290.17$ | $d_1 = 19.90$ | $n_1 = 1.61800$ | $\nu_1 = 63.4$ |
| | $r_2 = 891.67$ | $d_2 = 0.49$ | | |
| $L_2$ | $r_3 = 119.80$ | $d_3 = 5.83$ | $n_2 = 1.74100$ | $\nu_2 = 52.7$ |
| | $r_4 = 56.08$ | $d_4 = 19.47$ | | |
| $L_3$ | $r_5 = 110.59$ | $d_5 = 5.87$ | $n_3 = 1.64000$ | $\nu_3 = 60.2$ |
| | $r_6 = 61.82$ | $d_6 = 12.23$ | | |
| $L_4$ | $r_7 = 126.08$ | $d_7 = 5.83$ | $n_4 = 1.64000$ | $\nu_4 = 60.2$ |
| | $r_8 = 82.04$ | $d_8 = 19.85$ | | |
| $L_5$ | $r_9 = 175.98$ | $d_9 = 59.81$ | $n_5 = 1.80518$ | $\nu_5 = 25.4$ |
| | $r_{10} = -304.60$ | $d_{10} = 15.05$ | | |
| $L_6$ | $r_{11} = 1019.49$ | $d_{11} = 18.88$ | $n_6 = 1.67000$ | $\nu_6 = 57.4$ |
| | $r_{12} = -127.51$ | $d_{12} = 0.49$ | | |
| $L_7$ | $r_{13} = -305.85$ | $d_{13} = 6.60$ | $n_7 = 1.80518$ | $\nu_7 = 25.4$ |
| | $r_{14} = 160.93$ | $d_{14} = 9.37$ | | |
| $L_8$ | $r_{15} = 1239.99$ | $d_{15} = 5.87$ | $n_8 = 1.84666$ | $\nu_8 = 23.9$ |
| $L_9$ | $r_{16} = 187.79$ | $d_{16} = 24.47$ | $n_9 = 1.58313$ | $\nu_9 = 59.4$ |
| | $r_{17} = -113.12$ | $d_{17} = 0.49$ | | |
| $L_{10}$ | $r_{18} = -642.38$ | $d_{18} = 12.19$ | $n_{10} = 1.71300$ | $\nu_{10} = 53.9$ |
| | $r_{19} = -223.24$ | $d_{19} = 0.49$ | | |

Example 1-continued

| | = 100, Aperture ratio = 1:2.0, field angle = ±47° | | | |
|---|---|---|---|---|
| lens | radius of curvature | spacing and thickness | refractive index | Abbé No. |
| $L_{11}$ | $r_{20} = -1011.00$ | $d_{20} = 10.83$ | $n_{11} = 1.80610$ | $\nu_{11} = 40.9$ |
| | $r_{21} = -324.47$ | | | |

Backfocus = 178.71 = 1.787F
$F_{1,2,3,4,5} = -468.42 = -F/0.213$
$f_{16}(n_8-n_9) = 49.49 = 0.495F$
Petzval's sum = 0.101

FIGS. 2A, 2B, 2C and 2D show respectively the spherical aberration and sine condition, the chromatic aberration, the distortion aberration, and the astigmatism aberration of the lens system constructed in this example.

EXAMPLE 2

Figure 3:
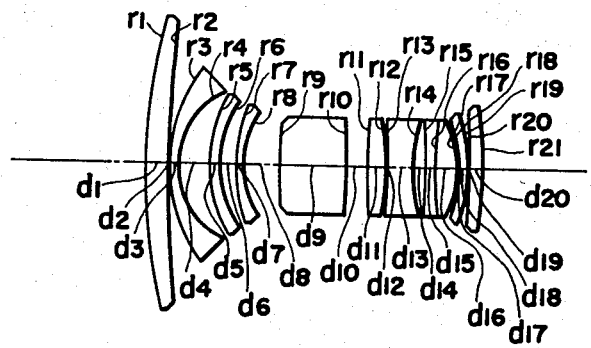
FIG. 3 is a simplified cross-sectional view of a lens system according to a second specific example of the invention.
Figure 4:
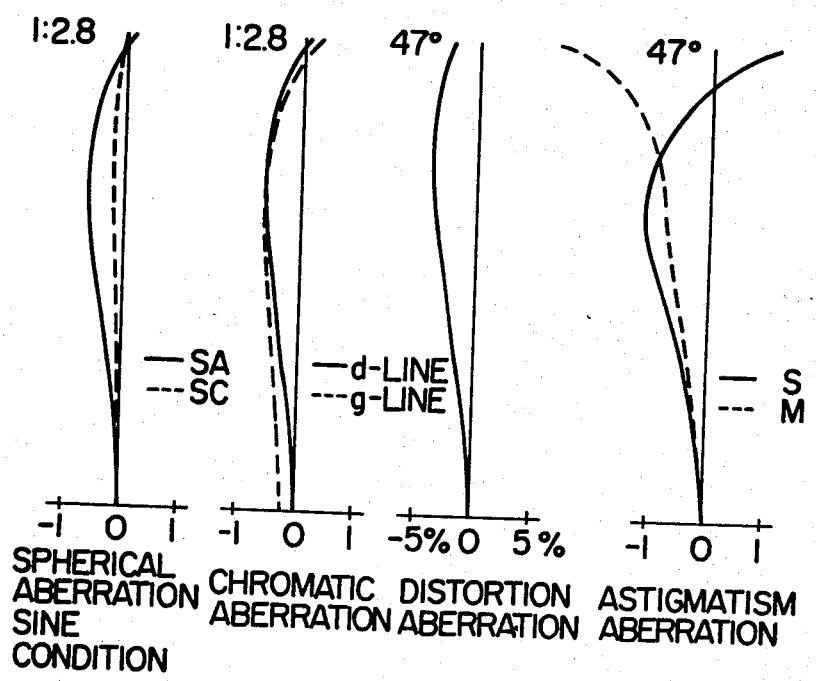
FIG. 4 are graphs showing the aberration curves obtained for the lens system constructed according to the second example.

FIG. 3 shows a lens system having the same overall structure of the lens system of Example 1. However, this lens system was constructed according to the following parameters:

FIGS. 4A, 4B, 4C and 4D show the aberration curves obtained for the lens system constructed according to this example.

EXAMPLE 3

Figure 5:
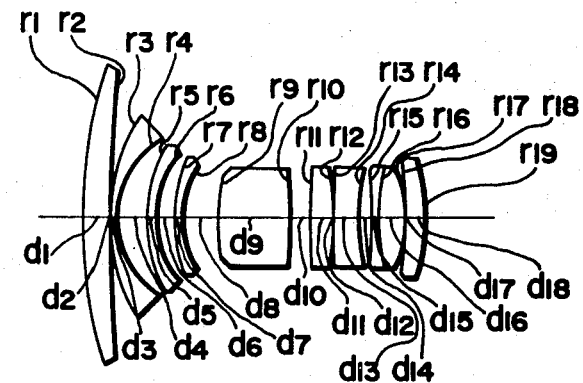
FIG. 5 is a simplified cross-sectional view of a lens system according to a third specific example of the invention.
Figure 6:
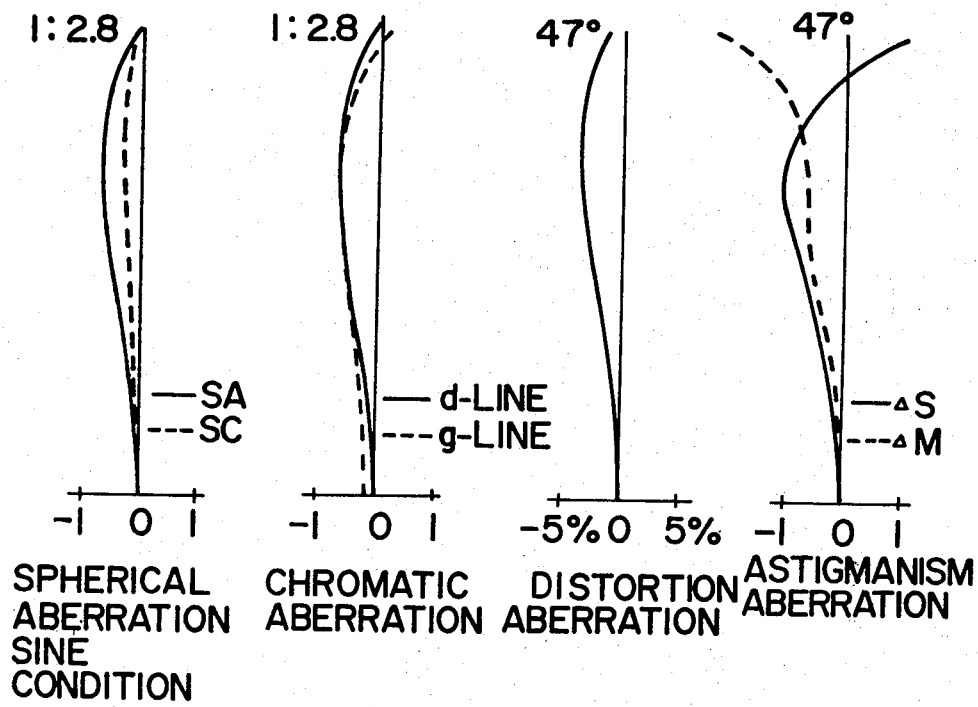
FIG. 6 are graphs showing the aberration curves obtained for the lens system constructed according to the third example.

FIG. 5 shows a lens system which is substantially similar to the lens systems of Examples 1 and 2 except that the rear lens component is composed of only a single positive lens. The lens system of this example was constructed according to the following parameters:

Example 2

| | F = 100, Aperture ratio = 1:2.8, field angle = ±47° | | | |
|---|---|---|---|---|
| Lens | radius of curvature | spacing or thickness | refractive index | Abbé No. |
| $L_1$ | $r_1 = 354.16$ | $d_1 = 18.54$ | $n_1 = 1.69680$ | $\nu_1 = 55.5$ |
| | $r_2 = 1036.22$ | | | |
| | | $d_2 = 0.49$ | | |
| $L_2$ | $r_3 = 120.38$ | $d_3 = 5.83$ | $n_2 = 1.77250$ | $\nu_2 = 49.7$ |
| | $r_4 = 58.41$ | | | |
| | | $d_4 = 20.73$ | | |
| $L_3$ | $r_5 = 96.61$ | $d_5 = 5.87$ | $n_3 = 1.61800$ | $\nu_3 = 63.4$ |
| | $r_6 = 58.64$ | | | |
| | | $d_6 = 11.02$ | | |
| $L_4$ | $r_7 = 99.73$ | $d_7 = 5.83$ | $n_4 = 1.61800$ | $\nu_4 = 63.4$ |
| | $r_8 = 59.63$ | | | |
| | | $d_8 = 23.64$ | | |
| $L_5$ | $r_9 = 163.63$ | $d_9 = 44.85$ | $n_5 = 1.80518$ | $\nu_5 = 25.4$ |
| | $r_{10} = -356.38$ | | | |
| | | $d_{10} = 14.56$ | | |
| $L_6$ | $r_{11} = 538.87$ | $d_{11} = 12.86$ | $n_6 = 1.69680$ | $\nu_6 = 55.5$ |
| | $r_{12} = -132.15$ | | | |
| | | $d_{12} = 0.49$ | | |
| $L_7$ | $r_{13} = -428.65$ | $d_{13} = 19.03$ | $n_7 = 1.80518$ | $\nu_7 = 25.4$ |
| | $r_{14} = 142.67$ | | | |
| | | $d_{14} = 5.83$ | | |
| $L_8$ | $r_{15} = 2709.46$ | $d_{15} = 5.87$ | $n_8 = 1.80518$ | $\nu_8 = 25.4$ |
| $L_9$ | $r_{16} = 163.98$ | $d_{16} = 16.26$ | $n_9 = 1.48749$ | $\nu_9 = 70.1$ |
| | $r_{17} = -80.29$ | | | |
| | | $d_{17} = 0.49$ | | |
| $L_{10}$ | $r_{18} = -123.78$ | $d_{18} = 6.60$ | $n_{10} = 1.80400$ | $\nu_{10} = 46.6$ |
| | $r_{19} = -123.65$ | | | |
| | | $d_{19} = 0.49$ | | |
| $L_{11}$ | $r_{20} = -22163.88$ | $d_{20} = 9.71$ | $n_{11} = 1.79952$ | $\nu_{11} = 42.2$ |
| | $r_{21} = -227.99$ | | | |

Backfocus = 178.50 = 1.785F
$F_{1,2,3,4,5} = -324.57 = -F/0.308$
$r_{16}(n_8-n_9) = 52.09 = 0.521F$
$\Sigma_d = 228.98 = 2.29F$
Petzval's sum = 0.092

Example 3

| lens | radius of curvature | spacing or thickness | refractive index | Abbé No. |
|---|---|---|---|---|
| | F = 100, Aperture ratio = 1:2.8, field angle = ±47° | | | |
| $L_1$ | $r_1 = 339.08$ | $d_1 = 17.02$ | $n_1 = 1.69680$ | $\nu_1 = 55.5$ |
| | $r_2 = 998.30$ | | | |
| | | $d_2 = 0.49$ | | |
| $L_2$ | $r_3 = 119.16$ | $d_3 = 5.83$ | $n_2 = 1.77250$ | $\nu_2 = 49.7$ |
| | $r_4 = 57.62$ | | | |
| | | $d_4 = 19.59$ | | |
| $L_3$ | $r_5 = 96.47$ | $d_5 = 5.88$ | $n_3 = 1.61800$ | $\nu_3 = 63.4$ |
| | $r_6 = 59.64$ | | | |
| | | $d_6 = 11.43$ | | |
| $L_4$ | $r_7 = 99.04$ | $d_7 = 5.83$ | $n_4 = 1.61800$ | $\nu_4 = 63.4$ |
| | $r_8 = 61.02$ | | | |
| | | $d_8 = 25.38$ | | |
| $L_5$ | $r_9 = 178.13$ | $d_9 = 47.21$ | $n_5 = 1.80518$ | $\nu_5 = 25.4$ |
| | $r_{10} = -402.91$ | | | |
| | | $d_{10} = 14.59$ | | |
| $L_6$ | $r_{11} = 450.93$ | $d_{11} = 16.00$ | $n_6 = 1.71300$ | $\nu_6 = 53.9$ |
| | $r_{12} = -138.10$ | | | |
| | | $d_{12} = 0.49$ | | |
| $L_7$ | $r_{13} = -472.60$ | $d_{13} = 17.45$ | $n_7 = 1.80518$ | $\nu_7 = 25.4$ |
| | $r_{14} = 141.25$ | | | |
| | | $d_{14} = 5.83$ | | |
| $L_8$ | $r_{15} = 1752.98$ | $d_{15} = 5.88$ | $n_8 = 1.80518$ | $\nu_8 = 25.4$ |
| $L_9$ | $r_{16} = 157.86$ | $d_{16} = 16.09$ | $n_9 = 1.51633$ | $\nu_9 = 64.1$ |
| | $r_{17} = -91.78$ | | | |
| | | $d_{17} = 0.49$ | | |
| $L_{10}$ | $r_{18} = -784.69$ | $d_{18} = 13.86$ | $n_{10} = 1.79952$ | $\nu_{10} = 42.2$ |
| | $r_{19} = -168.85$ | | | |

Backfocus = 178.62 = 1.786F
$F_{1,2,3,4,5}$ = −282.65 = −F/0.353
$r_{16}(n_8-n_9)$ = 45.60 = 0.456F
$\Sigma_d$ = 229.34 = 2.29F
Petzval's sum = 0.085

What is claimed is:
1. A miniature and large aperture wide-angle lens composed of eleven lenses grouped in nine lens components, in order from the object side to the image side, the first lens component being a positive lens, the second, third and fourth lens components each being a negative meniscus lens with it convex side directed toward the object, the fifth lens component being a thick positive lens, the sixth lens component being a positive lens, the seventh lens component being a negative lens, the eighth lens component comprising a negative lens and a positive lens cemented together to form a positive lens, and the ninth lens component comprising two positive lenses, wherein the radii of curvature $r_1$ to $r_{21}$, the spacings or thicknesses $d_1$ to $d_{20}$, the indicies of refraction $n_1$ to $n_{11}$ and Abbé numbers $\nu_1$ to $\nu_{11}$ of the first through the eleventh lenses $L_1$ to $L_{11}$ are as follows:

| lens | radius of curvature | spacing and thickness | refractive index | Abbé No. |
|---|---|---|---|---|
| | F = 100, Aperture ratio = 1:2.0, field angle = ±47° | | | |
| $L_1$ | $r_1 = 290.17$ | $d_1 = 19.90$ | $n_1 = 1.61800$ | $\nu_1 = 63.4$ |
| | $r_2 = 891.67$ | | | |
| | | $d_2 = 0.49$ | | |
| $L_2$ | $r_3 = 119.80$ | $d_3 = 5.83$ | $n_2 = 1.74100$ | $\nu_2 = 52.7$ |
| | $r_4 = 56.08$ | | | |

-continued

| lens | radius of curvature | spacing and thickness | refractive index | Abbé No. |
|---|---|---|---|---|
| | F = 100, Aperture ratio = 1:2.0, field angle = ±47° | | | |
| | | $d_4 = 19.47$ | | |
| $L_3$ | $r_5 = 110.59$ | $d_5 = 5.87$ | $n_3 = 1.64000$ | $\nu_3 = 60.2$ |
| | $r_6 = 61.82$ | | | |
| | | $d_6 = 12.23$ | | |
| $L_4$ | $r_7 = 126.08$ | $d_7 = 5.83$ | $n_4 = 1.64000$ | $\nu_4 = 60.2$ |
| | $r_8 = 82.04$ | | | |
| | | $d_8 = 19.85$ | | |
| $L_5$ | $r_9 = 175.98$ | $d_9 = 59.81$ | $n_5 = 1.80518$ | $\nu_5 = 25.4$ |
| | $r_{10} = -304.60$ | | | |
| | | $d_{10} = 15.05$ | | |
| $L_6$ | $r_{11} = 1019.49$ | $d_{11} = 18.88$ | $n_6 = 1.67000$ | $\nu_6 = 57.4$ |
| | $r_{12} = -127.51$ | | | |
| | | $d_{12} = 0.49$ | | |
| $L_7$ | $r_{13} = -305.85$ | $d_{13} = 6.60$ | $n_7 = 1.80518$ | $\nu_7 = 25.4$ |
| | $r_{14} = 160.93$ | | | |
| | | $d_{14} = 9.37$ | | |
| $L_8$ | $r_{15} = 1239.99$ | $d_{15} = 5.87$ | $n_8 = 1.84666$ | $\nu_8 = 23.9$ |
| $L_9$ | $r_{16} = 187.79$ | $d_{16} = 24.47$ | $n_9 = 1.58313$ | $\nu_9 = 59.4$ |
| | $r_{17} = -113.12$ | | | |
| | | $d_{17} = 0.49$ | | |
| $L_{10}$ | $r_{18} = -642.38$ | $d_{18} = 12.19$ | $n_{10} = 1.71300$ | $\nu_{10} = 53.9$ |
| | $r_{19} = -223.24$ | | | |
| | | $d_{19} = 0.49$ | | |

-continued

| lens | radius of curvature | spacing and thickness | refractive index | Abbé No. |
|---|---|---|---|---|
| | F = 100, Aperture ratio = 1:2.0, field angle = ±47° | | | |
| $L_{11}$ | $r_{20} = -1011.00$ $r_{21} = -324.47$ | $d_{20} = 10.83$ | $n_{11} = 1.80610$ | $\nu_{11} = 40.9$ |

Backfocus = 178.71 = 1.787F
$F_{1.2.3.4.5} = -468.42 = -F/0.213$
$f_{16}(n_8-n_9) = 49.49 = 0.495F$
Petzval's sum = 0.101 of the first through the eleventh lenses $L_1$ to $L_{11}$ are as follows:

| Lens | radius of curvature | spacing or thickness | refractive index | Abbé No. |
|---|---|---|---|---|
| | F = 100, Aperture ratio = 1:2.8, field angle = ±47° | | | |
| $L_1$ | $r_1 = 354.16$ $r_2 = 1036.22$ | $d_1 = 18.54$ | $n_1 = 1.69680$ | $\nu_1 = 55.5$ |
| | | $d_2 = 0.49$ | | |
| $L_2$ | $r_3 = 120.38$ $r_4 = 58.41$ | $d_3 = 5.83$ | $n_2 = 1.77250$ | $\nu_2 = 49.7$ |
| | | $d_4 = 20.73$ | | |
| $L_3$ | $r_5 = 96.61$ $r_6 = 58.64$ | $d_5 = 5.87$ | $n_3 = 1.61800$ | $\nu_3 = 63.4$ |
| | | $d_6 = 11.02$ | | |
| $L_4$ | $r_7 = 99.73$ $r_8 = 59.63$ | $d_7 = 5.83$ | $n_4 = 1.61800$ | $\nu_4 = 63.4$ |
| | | $d_8 = 23.64$ | | |
| $L_5$ | $r_9 = 163.63$ $r_{10} = -356.38$ | $d_9 = 44.85$ | $n_5 = 1.80518$ | $\nu_5 = 25.4$ |
| | | $d_{10} = 14.56$ | | |
| $L_6$ | $r_{11} = 538.87$ $r_{12} = -132.15$ | $d_{11} = 12.86$ | $n_6 = 1.69680$ | $\nu_6 = 55.5$ |
| | | $d_{12} = 0.49$ | | |
| $L_7$ | $r_{13} = -428.65$ $r_{14} = 142.67$ | $d_{13} = 19.03$ | $n_7 = 1.80518$ | $\nu_7 = 25.4$ |
| | | $d_{14} = 5.83$ | | |
| $L_8$ | $r_{15} = 2709.46$ | $d_{15} = 5.87$ | $n_8 = 1.80518$ | $\nu_8 = 25.4$ |
| $L_9$ | $r_{16} = 163.98$ $r_{17} = -80.29$ | $d_{16} = 16.26$ | $n_9 = 1.48749$ | $\nu_9 = 70.1$ |
| | | $d_{17} = 0.49$ | | |
| $L_{10}$ | $r_{18} = -123.78$ $r_{19} = -123.65$ | $d_{18} = 6.60$ | $n_{10} = 1.80400$ | $\nu_{10} = 46.6$ |
| | | $d_{19} = 0.49$ | | |
| $L_{11}$ | $r_{20} = -22163.88$ $r_{21} = -227.99$ | $d_{20} = 9.71$ | $n_{11} = 1.79952$ | $\nu_{11} = 42.2$ |

Backfocus = 178.50 = 1.785F
$F_{1.2.3.4.5} = -324.57 = -F/0.308$
$r_{16}(n_8-n_9) = 52.09 = 0.521F$
$\Sigma_d = 228.98 = 2.29F$
Petzval's sum = 0.092

2. A miniature and large aperture wide-angle lens composed of eleven lenses grouped in nine lens components, in order from the object side to the image side, the first lens component being a positive lens, the second, third and fourth lens components each being a negative meniscus lens with it convex side directed toward the object, the fifth lens component being a thick positive lens, the sixth lens component being a positive lens, the seventh lens component being a negative lens, the eighth lens component comprising a negative lens and a positive lens cemented together to form a positive lens, and the ninth lens component comprising two positive lenses, wherein the radii of curvature $r_1$ to $r_{21}$, the spacings or thicknesses $d_1$ to $d_{20}$, the indicies of refraction $n_1$ to $n_{11}$ and Abbé numbers $\nu_1$ to $\nu_{11}$ 3. A miniature and large aperture wide-angle lens composed of ten lenses grouped in nine lens components, in order from the object side to the image side, the first lens component being a positive lens, the second, third and fourth lens components each being a negative meniscus lens with it convex side directed toward the object, the fifth lens component being a thick positive lens, the sixth lens component being a positive lens, the seventh lens component being a negative lens, the eighth lens component comprising a negative lens and a positive lens cemented together to form a positive lens, and the ninth lens component comprising one positive lens, wherein the radii of curvature $r_1$ to $r_{19}$, the spacings or thicknesses $d_1$ to $d_{18}$, the indicies of refraction $n_1$ to $n_{10}$ and Abbé numbers $\nu_1$ to $\nu_{10}$ of the first through the tenth lenses $L_1$ to $L_{10}$ are as follows:

| | | F = 100, Aperture ratio = 1:2.8, field angle = ±47° | | |
|---|---|---|---|---|
| lens | radius of curvature | spacing or thickness | refractive index | Abbé No. |
| $L_1$ | $r_1 = 339.08$ $r_2 = 998.30$ | $d_1 = 17.02$ $d_2 = 0.49$ | $n_1 = 1.69680$ | $\nu_1 = 55.5$ |
| $L_2$ | $r_3 = 119.16$ $r_4 = 57.62$ | $d_3 = 5.83$ $d_4 = 19.59$ | $n_2 = 1.77250$ | $\nu_2 = 49.7$ |
| $L_3$ | $r_5 = 96.47$ $r_6 = 59.64$ | $d_5 = 5.88$ $d_6 = 11.43$ | $n_3 = 1.61800$ | $\nu_3 = 63.4$ |
| $L_4$ | $r_7 = 99.04$ $r_8 = 61.02$ | $d_7 = 5.83$ $d_8 = 25.38$ | $n_4 = 1.61800$ | $\nu_4 = 63.4$ |
| $L_5$ | $r_9 = 178.13$ $r_{10} = -402.91$ | $d_9 = 47.21$ $d_{10} = 14.59$ | $n_5 = 1.80518$ | $\nu_5 = 25.4$ |
| $L_6$ | $r_{11} = 450.93$ $r_{12} = -138.10$ | $d_{11} = 16.00$ $d_{12} = 0.49$ | $n_6 = 1.71300$ | $\nu_6 = 53.9$ |
| $L_7$ | $r_{13} = -472.60$ $r_{14} = 141.25$ | $d_{13} = 17.45$ $d_{14} = 5.83$ | $n_7 = 1.80518$ | $\nu_7 = 25.4$ |
| $L_8$ | $r_{15} = 1752.98$ | $d_{15} = 5.88$ | $n_8 = 1.80518$ | $\nu_8 = 25.4$ |
| $L_9$ | $r_{16} = 157.86$ $r_{17} = -91.78$ | $d_{16} = 16.09$ $d_{17} = 0.49$ | $n_9 = 1.51633$ | $\nu_9 = 64.1$ |
| $L_{10}$ | $r_{18} = -784.69$ $r_{19} = -168.85$ | $d_{18} = 13.86$ | $n_{10} = 1.79952$ | $\nu_{10} = 42.2$ |

Backfocus = 178.62 = 1.786F
$F_{1,2,3,4,5} = -282.65 = -F/0.353$
$r_{16} (n_8-n_9) = 45.60 = 0.456F$
$\Sigma_d = 229.34 = 2.29F$
Petzval's sum = 0.085

* * * * *

UNITED STATES PATENT AND TRADEMARK OFFICE
CERTIFICATE OF CORRECTION

PATENT NO. : 4,150,872
DATED : April 24, 1979
INVENTOR(S) : Takahiro SUGIYAMA

It is certified that error appears in the above-identified patent and that said Letters Patent are hereby corrected as shown below:

IN THE HEADING:

Assignee: Delete "Asahi Kogyo Kabushiki Kaisha"

Insert -- Asahi Kogaku Kogyo Kabushiki Kaisha --

Signed and Sealed this

Eleventh Day of September 1979

[SEAL]

Attest:

LUTRELLE F. PARKER

Attesting Officer — Acting Commissioner of Patents and Trademarks